(12) United States Patent
Beg et al.

(10) Patent No.: US 9,451,389 B2
(45) Date of Patent: Sep. 20, 2016

(54) METHODS AND SYSTEMS FOR COMMUNICATING GREETING AND INFORMATIONAL CONTENT USING NFC DEVICES

(71) Applicants: Kadeer Beg, So Plainfield, NJ (US); Ahmer Beg, Mississauga (CA)

(72) Inventors: Kadeer Beg, So Plainfield, NJ (US); Ahmer Beg, Mississauga (CA)

( * ) Notice: Subject to any disclaimer, the term of this patent is extended or adjusted under 35 U.S.C. 154(b) by 759 days.

(21) Appl. No.: 13/656,729

(22) Filed: Oct. 21, 2012

(65) Prior Publication Data
US 2014/0113549 A1 Apr. 24, 2014

(51) Int. Cl.
G06F 17/30 (2006.01)
H04W 4/00 (2009.01)
H04W 4/12 (2009.01)

(52) U.S. Cl.
CPC ........ *H04W 4/008* (2013.01); *G06F 17/30867* (2013.01); *H04W 4/12* (2013.01)

(58) Field of Classification Search
CPC .. H04L 61/6081; H04W 4/008; H04W 4/12; G06F 17/30867
See application file for complete search history.

(56) References Cited

U.S. PATENT DOCUMENTS

| | | | |
|---|---|---|---|
| 8,086,494 B2† | 12/2011 | Dooley | |
| 8,112,315 B2† | 2/2012 | Dooley | |
| 8,396,754 B2† | 3/2013 | Dooley | |
| 8,626,135 B1* | 1/2014 | Schilit et al. | 455/414.1 |
| 2011/0185037 A1 | 7/2011 | Tiedemann et al. | |
| 2012/0123827 A1* | 5/2012 | Dooley et al. | 705/14.1 |
| 2012/0252405 A1* | 10/2012 | Lortz et al. | 455/410 |
| 2012/0295542 A1* | 11/2012 | Telemi | 455/41.1 |
| 2013/0029686 A1* | 1/2013 | Moshfeghi | 455/456.1 |
| 2013/0046781 A1* | 2/2013 | Frankel | G06Q 30/02 707/769 |

OTHER PUBLICATIONS

"Near Field Communication," White paper ECMA International (internet document) http://www.ecma-international.org/activities/Communications/200- 4tg19-001.pdf, pp. 1-72.

* cited by examiner
† cited by third party

*Primary Examiner* — Lewis West

(57) ABSTRACT

The subject matter described herein relates to methods and systems for communicating digital greeting and informational content using a near field communication (NFC) devices, the content herein are of digital media type representing text, audio, video, image, and document formats. In one of the embodiments, unique programmed NFC stickers can be used conjunction with NFC enabled devices, such as a Smart Phone, to upload a personalized video or audio greeting on Central Server, doing so the sender activates the NFC sticker for distribution, when distributed, the recipient can tap on the same sticker and play the greeting message using the Smart Phone. In another embodiment, retail consumers can tap on NFC tags or sticker with Smart Phone to view product informational content that has been hosted on the Central Server by retailers and manufactures or by any organization that has similar needs.

32 Claims, 10 Drawing Sheets

METHODS AND SYSTEMS FOR COMMUNICATING GREETING AND INFORMATIONAL CONTENT USING NFC DEVICES

BACKGROUND OF THE INVENTION

1. Technical Field of the Invention

The present invention relates to data communications and wireless smart devices. More particularly, the subject matter described herein relates to methods and systems for communicating digital greeting messages and informational content using a near field communication (NFC) devices.

2. Description of Related Art

The traditional way of relaying greetings messages, events and product informational content has been paper based, in particular greeting cards that accompany a gift, invitation cards that need RSVP, and the literature that accompanies retail products.

For the instance of greeting cards, there are other methods that could be used when the greeting is not delivered along with the gift, one can easily relay the message via email, voicemail, text message, video or audio call using popular technologies like Face time, text messaging, Skype etc. Most of the aforementioned are supported by the majority of the Smart Phones. However, there is a lack of personalization when the need is to deliver the greeting message in hand, typically all instances where a greeting cards and post cards are used. The greeting cards and post cards have limited space to elaborately relay the greeting and also the format restricts on adding a personal touch. Typically people purchase greeting cards that have prewritten verbiage, and then add recipient's name and sign. It's obvious the creativity of the message is limited with the greeting card versus having the ability to personalize audio or video greeting message accessible on the Smart Phone by recipient. Furthermore, the electronic greetings can be saved, shared and referenced much easier than paper based. Another advantage would be to reduce the environmental impact by conserving paper use.

The above applies to event announcements and invitation cards, for example there is limited access to the parents contact information when inviting kids to a birthday party, paper based card are generally delivered to school and parents RSVP by calling or returning the card. Similar challenges exist in personalization of the announcement and getting RVSP in an efficient manner.

Another area consumers can benefit is by having paperless access to information related to the retail and manufacturing industry. NFC posters have recently been introduced in the market, they are generally used for advertising. There is no mechanism to instantly get presale and post sale information about products on shelves in retail stores. The information available related to the products lacks the following; Product information such as specifications, manuals, sales literature, discount codes/rebate offerings, reviews, ratings, warrantees, product registration, assembly, recommended configuration or usage instructions are not available to the consumer while shopping in the store or post sales. Most information is collected by consumer from the packaging which limits the content. If a consumer chooses to search on the internet with a Smart Phone, that information is not cataloged for easy access and requires complex search efforts to find relevant information quickly. The manufacturer of the product could carry many lines of product so it is difficult to filter thru their site. The desired language may not be supported for foreign manufacturer and some content may not published on their website or they may have not assembled such information internally but may be contributed by community e.g. video recorded instruction to install a car part or video how to use a tool. Product manuals, warranty literature, and assembly instructions for most products are distributed paper based and there is rarely an instructional video distributed along e.g. home furniture assembly instructions.

Many retail stores carry a variety of brands for which they are not the original equipment manufacturers, and thus unable to offer additional information if not provided on the packaging or accompanying literature. Some manufacturers do not publish lot of this relevant information electronically because the method for potential purchaser to consume this information is unknown to them. For the companies that manufacture few lines of products, it can be expensive for them to create and manage their own website.

If one extends the concept of products to imply museum artifacts and Zoo animals, the same issues affect the industry in sharing information content efficiently with the patron. Poster or display space is limited on site, so organizations are restricted in the ability to publish elaborate content about artifacts or animals related to providing detailed descriptions, pictures, videos and facts.

There is limited method or system that provides direct access from Smart Phone to product related material for the consumer in presale or post sale period for content mentioned earlier. Similarly, museums and Zoos, lack the method or system to relay elaborate content to a Smart Phone patron visiting.

Mobile communication devices continue to grow in popularity and in features capability. Smart Phones in particular have become an integral part of both personal and business communications. These multi-function devices incorporate PDA features, media players, wireless email capability, and internet browsers which access the internet via a cellular network and/or a wireless local area network (WLAN).

Some mobile devices incorporate contactless card technology and/or near field communication (NFC) chips. NFC technology is commonly used for contactless short-range communications based on radio frequency identification (RFID) standards, using magnetic field induction to enable communication between electronic devices, including mobile wireless communications devices. This short-range high frequency wireless communications technology exchanges data between devices over a short distance, such as only a few centimeters.

The nature of this kind of RFID communication is 'tap' based where an RFID target device is held for a relatively short time in the RFID reader device's interrogation field. The 'tap' paradigm is based on user experience analysis where a 'tap' action measured in time should be equal to or less than 0.5 seconds. Thus, NFC RFID is only suitable for exchanging small data items where a transfer can be completed in a reasonably short time interval (less than 0.5 seconds). For larger data items it is preferred to utilize alternative transport mechanisms available in the portable device (e.g. mobile telephone or terminal device) such as WLAN or Bluetooth technology. In many cases, RFID can be seen as a user input enhancement where instead of requesting user guidance to manually create a connection between devices, RFID communication is used to exchange communication details by just tapping another NFC enabled device.

NFC devices are unique in that they support three modes of operation: reader/writer, peer-to-peer, and card emulation. The different operating modes are based on the ISO/IEC 18092 NFC IP-1 and ISO/IEC 14443 contactless smart card standards. In reader/writer mode, the NFC device is capable of reading NFC Forum-mandated tag types, such as a tag embedded in an NFC smart poster, sticker or tag. The reader/writer mode on the RF interface is compliant with the ISO 14443 and FeliCa schemes. In Peer-to-Peer mode, two NFC devices can exchange data. For example, you can share Bluetooth or WiFi link set-up parameters or you can exchange data such as virtual business cards or digital photos. Peer-to-Peer mode is standardized on the ISO/IEC 18092 standard. In Card Emulation mode, the NFC device appears to an external reader much the same as a traditional contactless smart card. This enables contactless payments and ticketing by NFC devices without changing the existing infrastructure.

For background information on the present invention the reader is referred to a white paper entitled "Near Field Communication" published by ECMA International under document number ECMA/TC32-TG19/2005/012. That document shows near field communication equipped devices brought into close proximity in order to exchange parameters necessary for setting up a communication with more bandwidth using a secondary communication technology, other than NFC, such as Wireless LAN (WLAN) or Bluetooth.

Other References

"Near Field Communication," White paper ECMA International (internet document) http://www.ecma-international.org/activities/Communications/tc32-tg19-2005-012.pdf, pp. 1-72. cited by other.

SUMMARY OF THE INVENTION

Certain aspects of embodiments disclosed herein by way of example are summarized below. It should be understood that these aspects are presented merely to provide the reader with a brief summary of certain forms that any implementation disclosed and/or claimed herein might take and that these aspects are not intended to limit the scope of the present disclosure. Indeed, any implementation disclosed and/or claimed herein may encompass a variety of aspects that may not be set forth below.

The invention relates to methods and systems for communicating digital greeting and informational content using a near field communication (NFC) devices. Greeting in the disclosure is related to messages that are traditionally delivered via greeting cards and post cards. Informational content in the disclosure is related to Events (e.g. announcement, invitations, surveys, marketing, campaigns, sign up etc) and Products (e.g. goods, items, artifacts, objects etc). The messages and content herein are of digital media type representing text, audio, video, image, and document formats.

NFC tags or stickers are used to communicate greeting messages, events and product informational content, by tapping an NFC enabled Smart Phone on an area having a passive NFC sticker or tag, the Smart Phone is able to send identifier information related to the passive NFC sticker or tag over the wireless network and receive greeting message and informational content. The greeting messages and informational content may then be displayed by the Smart Phone.

NFC based stickers or tags are preconfigured with unique identifier comprising of Universal Resource Locator (URL) pointing to a Central Server with (unique identifier) UID and/or (Batch identifier) Batch ID. UID uniquely identifies NFC sticker or tag, and Batch ID identifies a group of UIDs. The Central Server manages and facilitates an NFC sticker or tag activation and content assignment by a Smart Phone user. The Central Server correlates the unique identifier and Batch identifier of the stickers with content stored and further assists in hosting and managing content and messages. As discussed earlier in the background, the invention addresses the current short comings related to paper based greeting cards, product literature and content by surfacing the information instantaneously to the NFC enabled Smart Phone user. The invention promotes paperless information content access and delivery, and does not require custom application to be deployed on the Smart Phones OS platforms.

Some of the practical uses and scenarios of the invention are as follows: A Smart Phone user can deliver a personalized video greeting to another Smart Phone user, initiator taps NFC sticker to upload video message, the recipient taps to play the video message on the same NFC sticker which serves as a medium of deliver for greeting message over traditional paper based card; A Smart Phone user can deliver a personalized video invitation to one or more Smart Phone users and get consolidated RSVP details back, initiator taps on the master NFC sticker to upload video message and requests RSVP, the recipients taps to play the video message on the batch related individual NFC stickers and input RSVP details, initiator taps again on master NFC sticker and gets the latest RSVP responses status; A Smart Phone user visits a museum and taps on a NFC sticker on a pedestal in front of the statue, and gets the details of the artifact, which may contain history, additional pictures, video clips; A Smart Phone user visits a Zoo, taps on the NFC sticker placed on the plaque in front of the cage, and gets details on the animal, which may contain video in habitat, pictures, characteristics, ancestry and species facts; A Smart Phone user purchases a table, before assembly taps on the NFC sticker placed on the package box, gets the video showing the assembly of the table and link to online instruction manual.

As used herein, the terms "product" and "retail product" and "artifacts" may be synonymous and are intended to refer to any object that can be solicited for supplemental informational content by tapping with NFC enabled device. This includes objects hosting museum artifacts, cages containing animals, pedestals, racks, posters, frames, paintings, retail package content, retail product components, gift wrap, gift bow, gift cards, any manufactured parts, product accessories, retail items and any artifact that a NFC sticker or tag can be placed onto from which supplemental content is desired.

As used herein, the terms "Smart Phone", "wireless smart device", "NFC device", and "NFC enabled device" may be synonymous and are intended to refer to any device with NFC, radio frequency (RF) communication, or barcode capturing capabilities to interact with a smart tag or smart sticker with the corresponding technology. As used herein, the term "smart tag" or "smart sticker" or "NFC tag" or "NFC sticker" or "NFC chip" may be synonymous and are intended to refer to any NFC passive device. In near field communication, a wireless smart device may communicate with a passive wireless transceiver NFC tag or NFC sticker located on or in the product packaging via inductive coupling of the smart tag antenna to the NFC device antenna. The two or more loop antennas effectively form a transformer. The smart tag amplitude-modulates the RF field to send information to the device. The device communicates with the transceiver and/or reader by modulating the loading on the device antenna, which also modulates the load on the reader antenna. As used herein, the term "wireless communications" includes communications conducted at ISO 14443 and ISO 18092 interfaces. These specifications define communication protocols for wireless smart devices operating in close proximity with a reader antenna.

The subject matter described herein may be implemented in software, in combination with hardware and/or hardware and firmware. For example, the subject matter described herein may be implemented in software executed by a hardware based processor. In one exemplary implementation, the subject matter described herein for uploading video, playing video or other digital content using a NFC device may be implemented using a non-transitory computer readable medium to having stored thereon executable instructions that when executed by the hardware processor of a computer, control the processor to perform steps. Exemplary non-transitory computer readable media suitable for implementing the subject matter described herein include chip memory devices or disk memory devices accessible by a processor, programmable logic devices, and application specific integrated circuits. In addition, a computer readable medium that implements the subject matter described herein may be located on a single computing platform or may be distributed across plural computing platforms.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. Again, the brief summary presented above is intended only to familiarize the reader with certain aspects and contexts of embodiments of the present disclosure without limitation to the claimed subject matter.

DETAILED DESCRIPTION OF THE INVENTION

Accordingly, it is to be understood that the embodiments of the invention herein described are merely illustrative of the application of the principles of the invention. Reference herein to details of the illustrated embodiments is not intended to limit the scope of the claims, which themselves recite those features regarded as essential to the invention.

It is understood that various details of the presently disclosed subject matter may be changed without departing from the scope of the presently disclosed subject matter. Furthermore, the foregoing description is for the purpose of illustration only, and not for the purpose of limitation.

One or more specific embodiments of the present techniques will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
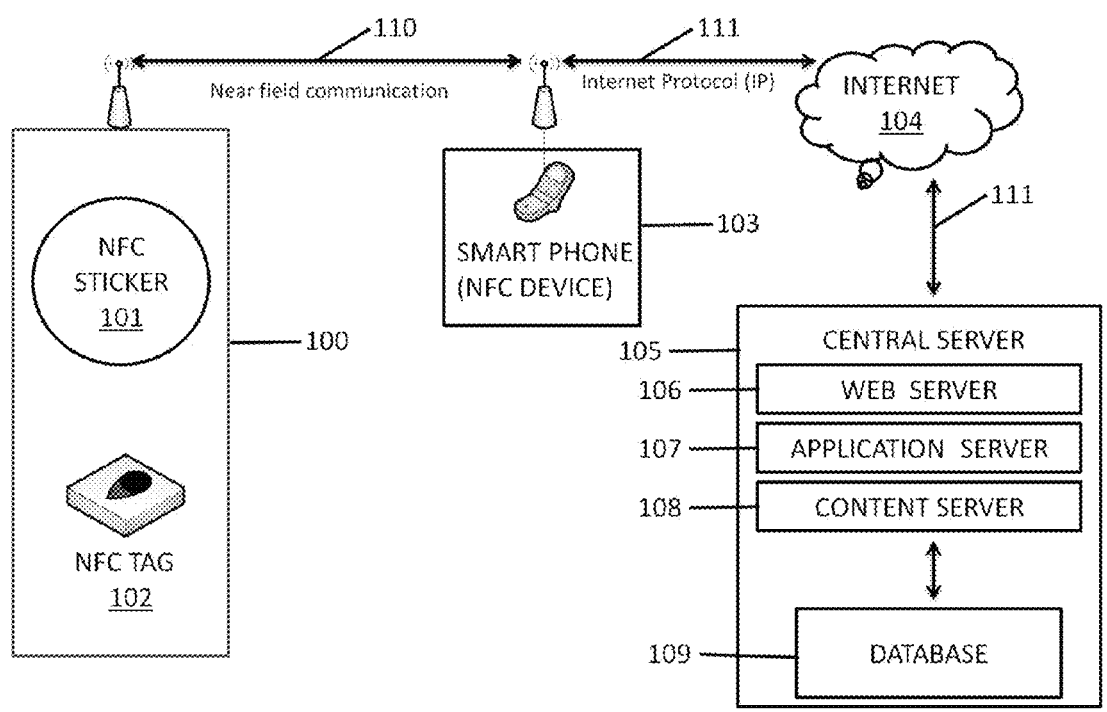
FIG. 1 is an illustration of a Smart Phone communicating with the NFC sticker or tag and Central Server in accordance with the present disclosure.

Turning to back to FIG. 1, is an illustration of a NFC enabled Smart Phone 103 communicating with the NFC stickers or tags 100 and Central Server 105 in accordance with the present disclosure. NFC sticker 101 and NFC tag 102 are near field communication passive devices. They are pre-programmed with a unique Universal Resource Locator (URL). For example URL consisting of https://www.tapformessage.com/greeting?v=[UID], where [UID] is the unique identifier, and the domain www.tapformessage.com identifies the Central Server 105 over the internet 104. Each NFC sticker or tag URL is unique in the method described, allowing the Central Server 105 to identify the sticker or tag 100 uniquely when receiving request.

Figure 8:
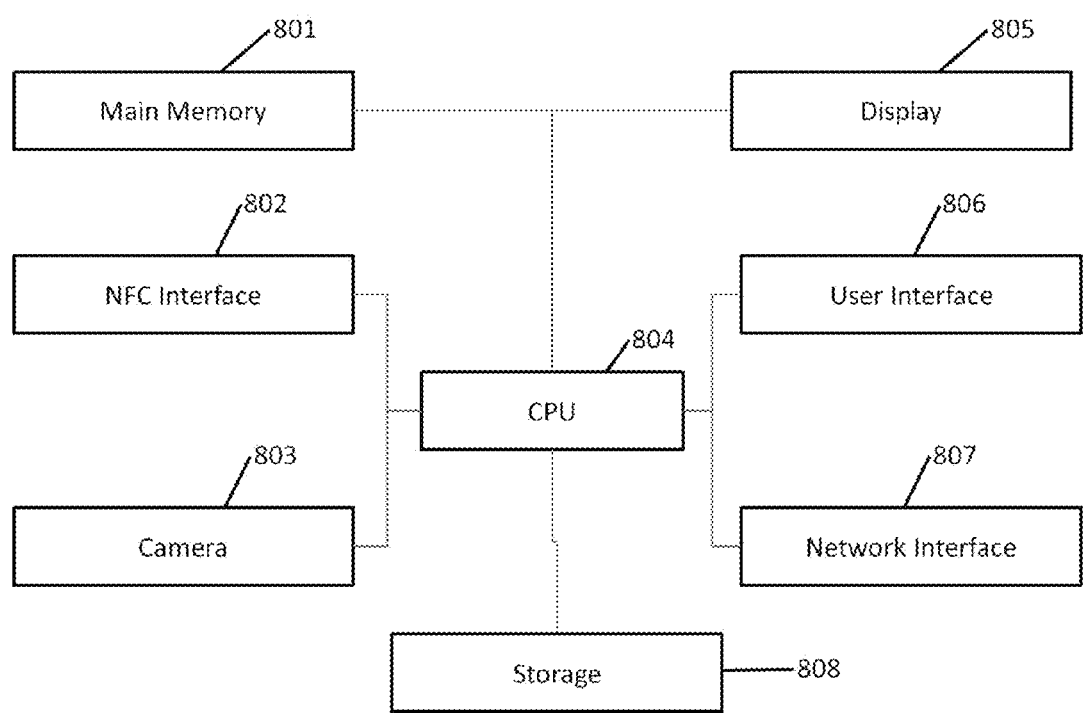
FIG. 8 is a block diagram illustrating a Smart Phone configured to process benefits associated with greeting messages and informational content.

Smart Phone 103 is an NFC enabled device, consisting of components illustrated in FIG. 8, an Smart Phone 103 may be configured for data communication, storing, or displaying content related to greeting, event or product information. It should be appreciated that embodiments of the Smart Phone 103 may include more or fewer elements than depicted in FIG. 8. Turning to FIG. 8, Smart Phone 103 may include at least one central processing unit (CPU) 804. The CPU 804 may provide processing capability to execute an operating system, run various applications, and/or provide processing for one or more of the techniques described herein. Applications may include, for example, software for managing and playing audiovisual content, software for managing a internet browser capabilities, software for controlling telephone capabilities, and software for managing network communications.

A main memory 801 may be communicably coupled to the CPU 804, which may store data and executable code. The main memory 801 may represent volatile memory such as RAM, but may also include nonvolatile memory, such as read-only memory (ROM) or Flash memory. In buffering or caching data related to operations of the CPU 804, the main memory 801 may store data associated with applications running on the Smart Phone 103.

The Smart Phone 103 may also include nonvolatile storage 808. The nonvolatile storage 808 may represent any suitable nonvolatile storage medium, such as a hard disk drive or nonvolatile memory, such as Flash memory. Being well-suited to long-term storage, the nonvolatile storage 808 may store data files such as media (e.g., music and video files), preference information (e.g., media playback preferences), wireless connection information (e.g., information that may enable media device to establish a wireless connection such as a telephone connection), It should be appreciated that certain video, audio and informational content may be saved in the nonvolatile storage 808, as discussed further below.

A display 805 may display images and data for Smart Phone 103, the display 805 may function as a touch screen through which a user may interact with the Smart Phone 103. The user interface 806 may represent indicator lights and user input structures, but may also include a graphical user interface (GUI) on the display 805. In practice, the user interface 806 may operate via the CPU 804, using memory from the main memory 801 and long-term storage in the nonvolatile storage 808. As should be appreciated, one or more applications may be open and accessible to a user via the user interface 806 and displayed on the display 805.

One or more network interfaces 807 may exist on the Smart Phone 103 for network connectivity. The network interface 807 may be any network including, but not limited to, a telephone network or a computer network (e.g., the interne, a local area network, a wide area network, and/or wireless network such as a cellular network, a Wi-Fi network according to Institute of Electrical and Electronics Engineers (IEEE) standards 802.11a/b or g or other such wireless local area network standards, or a WiMax network according to IEEE standard 802.16 or another such wireless broadband standard).

Certain embodiments of the Smart Phone 103 may also include a near field communication (NFC) interface 802. The NFC interface 802 may have a range of approximately 2 to 4 cm. The close range communication with the NFC interface 802 may take place via magnetic field induction, allowing the NFC interface 802 to communicate with other NFC device 100 or to retrieve information from NFC stickers 101 having radio frequency identification (RFID) circuitry as explained earlier. NFC interface program may have the ability to spawn the browser application directly or request user input to spawn.

The Smart Phone 103 of FIG. 8 may also include a camera 803. With the camera 803, the Smart Phone 103 may obtain digital images or videos. In combination with optical character recognition (OCR) software, barcode-reading software, or matrix-code-reading software running on Smart Phone 103, the camera 803 may be used to input data from printed materials having text or barcode information. Such data may include product data from a matrix barcode on a product, so QR codes may be used by Smart Phones 103 as an alternative for non NFC enabled Smart Phones 103 to benefit from the disclosure.

Continuing back on FIG. 1, Central Server 105 correlates the unique identifier of the stickers 101 with content stored as the request is received from the Smart Phone 103 over the internet 104 using internet protocol (IP) 111, further assists in hosting and managing content and messages. For instance Central Server 105 manages and facilitates the NFC sticker or tag 100 activation and content assignment by Smart Phone user, which will be discussed further below.

Central Server 105 contains the Web Server 106, Application Server 107, Content Server 108 and the database 109. Web Server 106 is configured to accept https request on the IP address and domain name submitted by the Smart Phone 103 via the internet based on the URL discovered from the NFC sticker or tag 100. Simply, URL points to the Web Server, the Web Server maintains secure SSL connection during communication. The Web Server forwards the request to Application Server 107, application server is a program that handles all application operations between users and databases 109. For instance the program to parse the UID from URL, and the ability to query against the database for correlation and update exists within the application server 107. Content Server 108 manages Web content, which includes text and embedded pictures, graphics, photos, video, audio, and document files that displays content or interacts with the user. A Content Server 108 may catalog and index content, select or assemble content at runtime, or deliver content in a requested way, such as other languages or by applying templates to organize the display. In addition, a computer readable medium that implements the subject matter described herein may be located on a single computing platform or may be distributed across plural computing platforms.

Continuing on FIG. 1, the database 109 stores the data, attributes and relationship of entities within, specifically the content related to the disclosure. For example, UID, greeting message attributes, state, instance invoked, product specifications, reference URI to additional content location etc. Not all content will be stored in the database 109, it may be distributed to file system repositories and other methods of storage to optimize the performance. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals.

Figure 2:
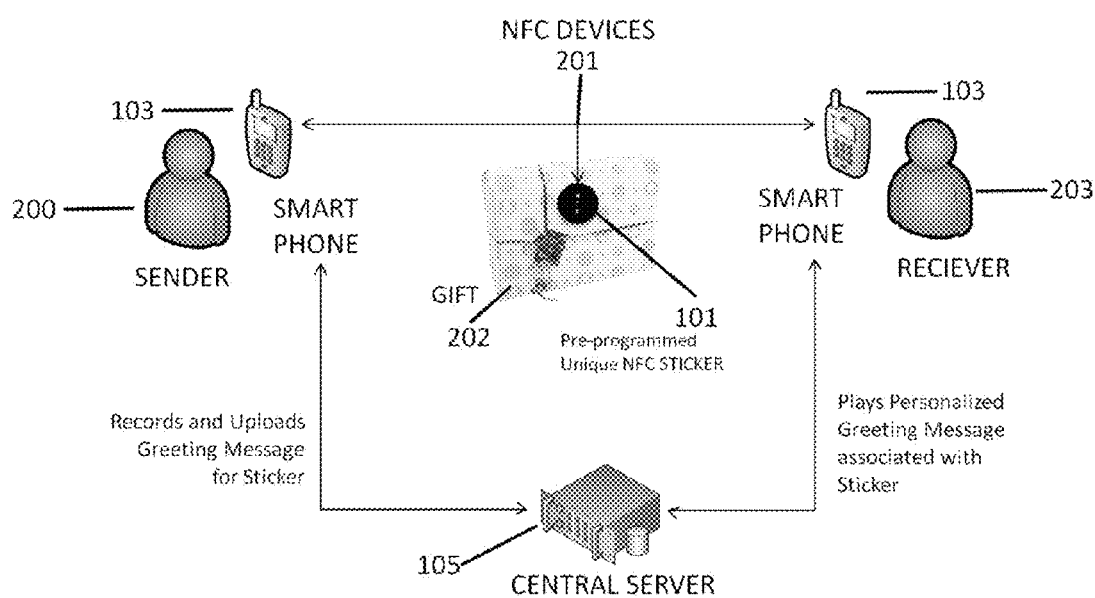
FIG. 2 shows the communication process of Sender and Receiver of the greeting message using NFC devices according to an embodiment of the disclosure.

Turning to FIG. 2, Shows the communication process of Sender 200 and Receiver 203 of the Greeting Message using NFC devices 201 according to an embodiment of the disclosure. The Sender 200, is the author, creator or publisher of the message. The consumer who wishes to share his personal recording with the desired receipt (Receiver) 203. The Receiver 203, is the individual that consumes the message that is shared by the sender 200 by playing and listening to the recording that has been delivered. Sender 200 and Receiver 203 both use Smart Phones 103 to communicate with Central Server 105. Smart Phones 103 and NFC sticker 101 are both NFC Devices 201. Gift 202, represents the package in the example where the pre-programmed NFC sticker 101 is placed onto, this could be any medium that sticker 101 can be placed on, not meant to restrict use by example.

Figure 3:
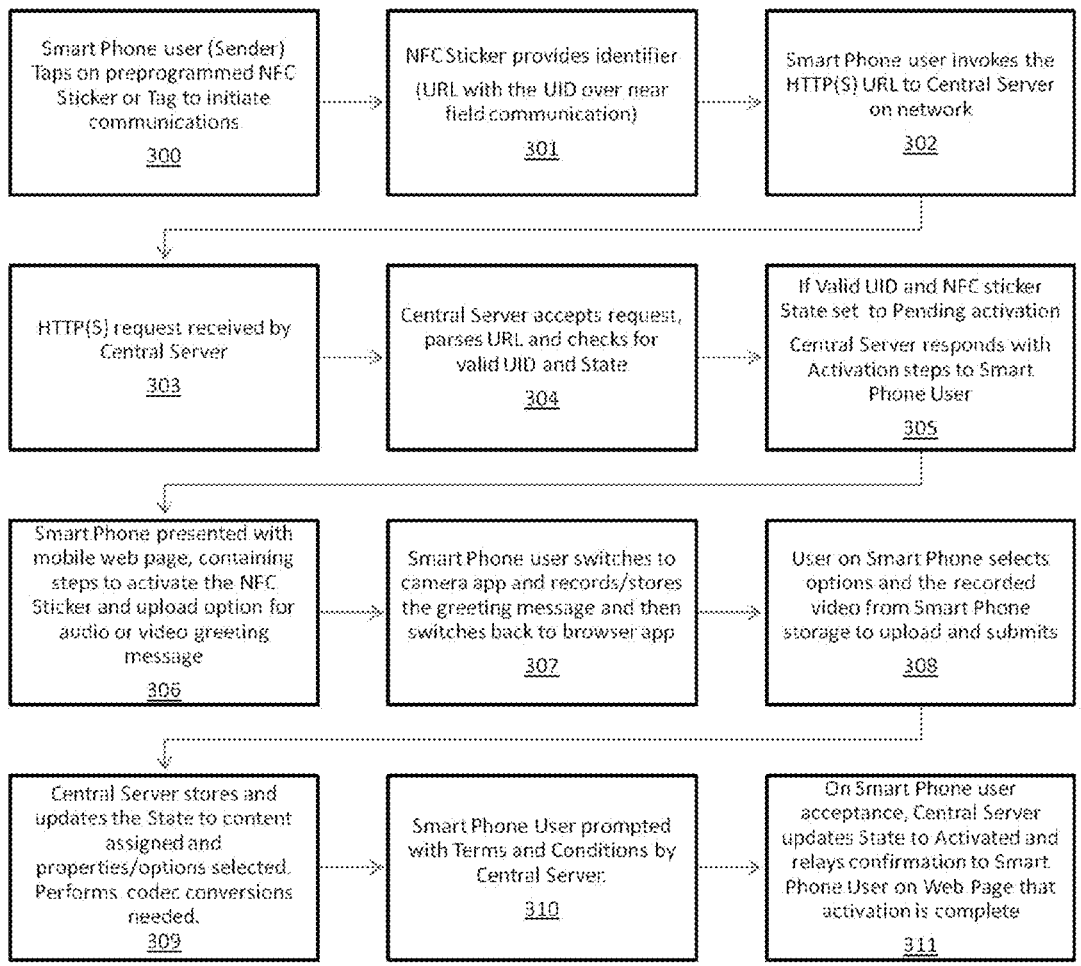
FIG. 3 is a flow diagram showing the method of activation and video upload process for Sender's personalized greeting message according to an embodiment of the disclosure.
Figure 4:
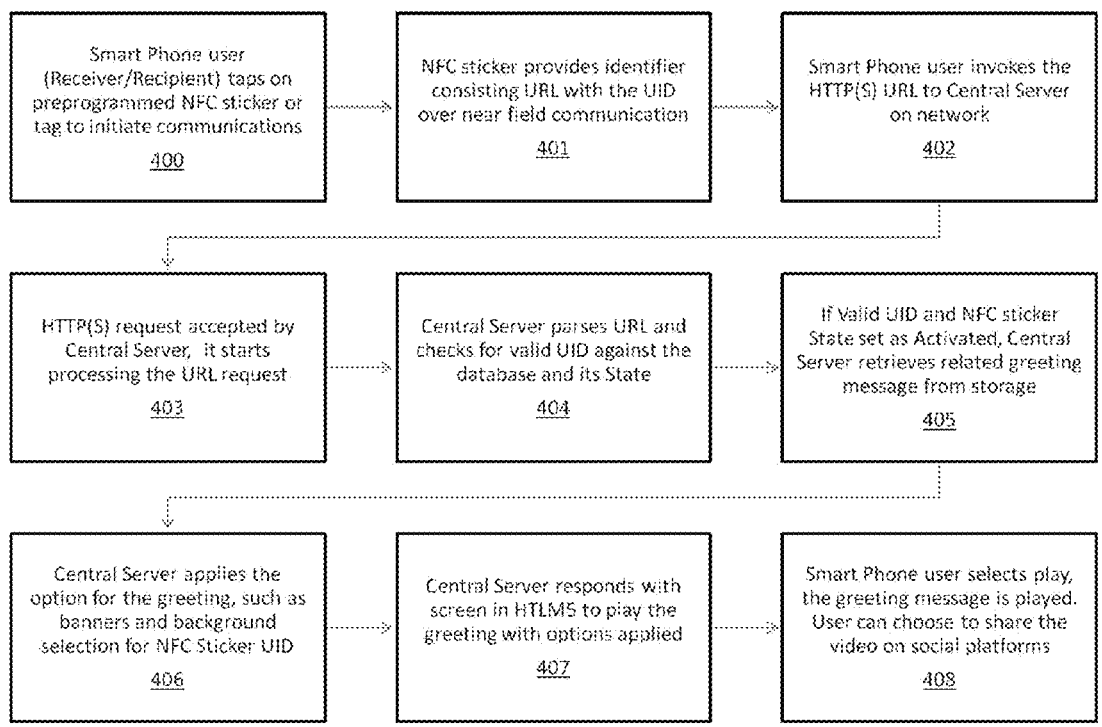
FIG. 4 is a flow diagram showing the method for playing the greeting message by Recipient using NFC devices according to an embodiment of the disclosure.

In the FIG. 2 example, Sender 200 is sending a gift with a personalized greeting message to Receiver 203 instead of using the traditional greeting card. Continuing with the example, the Gift 202 maybe physically delivered by postal service or hand delivered, showing location could be same or different for the Sender 200 or Receiver 203, using their individual Smart Phones 103. The Sender 200, when remotely located from the Gift 202 and NFC Sticker 101, can initiate communications using the HTTP(S) URL of the preprogrammed NFC Sticker 101 using any browser based device such as a Smart Phone or personal computer, the said URL can be relayed by online Retailer 502 or Central Server 105 to Sender 200 before package is delivered by postal service to Receiver 203. The steps of communicating the greeting message is depicted in FIG. 3 and FIG. 4 using an example of a local Sender 200 that is in proximity to NFC Sticker 101 and Gift 202, it should be clear that similarly a remote Sender 200 can initiate communication to Central Server 105 by launching the URL link when presented in a web page, email or by some notification service. Similarly, a Receiver 203 can social share the NFC Sticker 101 identifier with another remote Receiver 203 to view content.

FIG. 3 is a flow diagram showing the method of activation and video upload process for Sender's 200 personalized greeting message according to an embodiment of the disclosure. Smart Phone 103 user (Sender) 200 taps on pre-programmed NFC sticker or tag 100 to initiate communications 300. NFC sticker 101 provides identifier consisting URL with the UID over near field communication 301. Smart Phone user invokes the HTTP(S) URL to Central Server 105 on Network (WLAN, WAN, Wi-Fi, 3G, 4G, or other cellular networks) using Smart Phone browser 302. HTTP(S) request received by Central Server 105, it contains Web 106, Application 107, and Content Server 108 components, it starts processing the URL request 303. Central Server accepts request 105, parses URL and checks for valid UID against the database 109 and its State 304. If Valid UID and NFC tag State is set for pending activation, then Central Server responds with Activation steps to Smart Phone User 305 with HTML 5 page. Smart Phone 103 is presented with mobile web page, containing steps to activate the NFC sticker 103 and upload options for audio or video greeting message 306. Smart Phone user switches to camera 803 app and records the greeting message and then switches back to browser app 307. This is done if the message is not already recorded, so the user can record the greeting message so the file is available for upload, alternatively the user can select file without switching to camera application to record. User on the Smart Phone 103 selects options and the recorded video from Smart Phone storage 808 to upload and submits 308. The request received by Central Server 105 includes enrichment properties (banner text etc), options (social share options, terms and conditions etc), audio or video file, Central Server 105 stores and updates the State to Content assigned and properties/options selected. Performs codec conversions needed 309. Smart Phone User prompted with Terms and Conditions by Central Server 310. After the user accepts Terms and Conditions, on Smart Phone user acceptance, the Central Server updates state to Activated and relays confirmation to Smart Phone user on Web Page that activation is complete 311.

FIG. 4 is a flow diagram showing the method for playing the greeting message by Recipient (Receiver) 203 using NFC devices according to an embodiment of the disclosure. Smart Phone user (Receiver/Recipient) 203 taps on pre-programmed NFC sticker or tag 100 to initiate communications 400. NFC sticker 101 provides identifier consisting URL with the UID over near field communication 401. Smart Phone user invokes the HTTP(S) URL to Central Server 105 on Network (WLAN, WAN, Wi-Fi, 3G, 4G, or other cellular networks) using Smart Phone browser 402. HTTP(S) request received by Central Server 105, it contains Web 106, Application 107, and Content Server 108 components, Central Server accepts the request then starts processing the URL request 403. Central Server 105 parses URL and checks for valid UID against the database 109 and its State 404. If valid UID and NFC sticker 101 State is set as Activated, application server 106 fetches related greeting message from storage 405. Central Server 105 applies the option for the greeting, such as banners, background selection, and social sharing options availability for NFC sticker UID 406. Central Server responds with screen in HTLM5 to play the greeting with options applied 407. Smart Phone user selects play, the greeting message is played on screen 408. If social sharing options are enabled, the user has the ability to share the video to social media platforms such as RSS, FeedBurner, Amazon, Bandcamp, Facebook, Flickr, iTunes, Last.fm, MySpace, Soundcloud, Twitter, Vimeo, YouTube etc.

Figure 5:
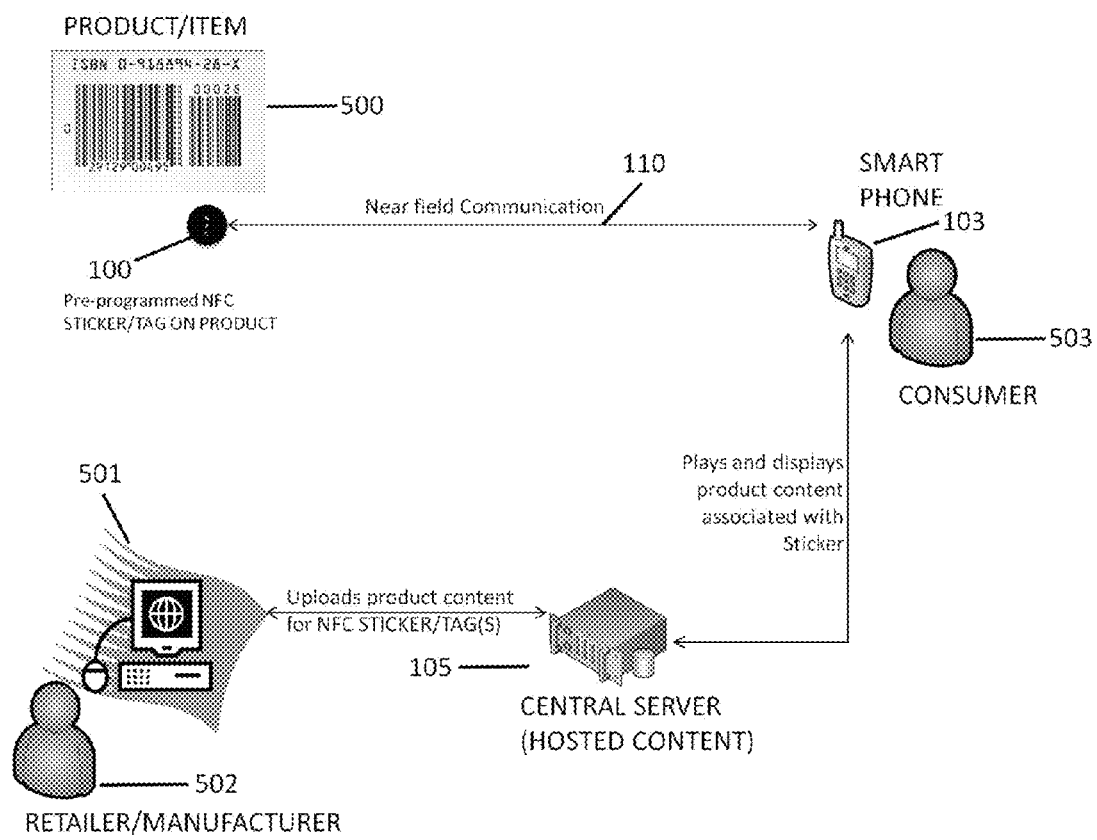
FIG. 5 shows the communication process of Retailer/Manufacturer and Consumer with Central Server for Product content using NFC devices according to an embodiment of the disclosure.

Turning to FIG. 5, shows the communication process of Retailer/Manufacturer 502 and Consumer 503 with Central Server 105 for Product content using NFC devices 201 according to an embodiment of the disclosure. Retailer 502 is a business or person that sells goods to the Consumer 503, for the purpose of this example the Retailer 502 has a physical store that carry's goods, these goods are referred herein to as Product/Item(s) 500. Consumer 503 is the shopper that could benefit from the information content on the Products/Items 500. Manufacturer 502 are the manufacturers of the Products/Items 500 that other retailers resell or they may have their own retail store fronts. Retailer may carry products from different manufacturer (e.g. Best Buy, Sears) and manufacturers can be retailers of their own products (e.g. Ashley Furniture, Sears, Coach, IKEA, BMW Dealership). For practical purposes of this discussion, Retailer and Manufacturer 502 are combined in the diagram as per their common intent, they both provide products 500 and there is informational content that the consumer will seek on those products 500. However, the product informational content may be different for Retailer and Manufacturer 502 for the same product 500, for example manufacturer may want to provide video of assembly instructions, warranty and/or an online manuals for the products 500 versus retailer may want to make product specifications, pricing, and/or discounts available when a consumer taps on the sticker placed on the product 500. The invention accommodates both Retailer and Manufacture 502 in the same manner from a practical purposes of this disclosure. Additionally, the disclosure implies the products to include any artifact or object where informational content is desired. Further includes organizations that are not Retailers or Manufacturer to interact in a similar manner. For example Museums and Zoos, who do not manufacture products or sell products but have the same need to provide information on their artifacts and animals, respectively.

Retailer/Manufacture 502 may use Smart Phone 103 method as shown in FIG. 2 to upload content to Central Server 105, however due to the greater anticipated amount of content for products, unlike the greeting message which is an audio or video message upload, an alternative method of uploading product content for NFC tags or stickers 100 is depicted in FIG. 5. An interface is provided to the Central Server 105, where the Retailer/Manufacture 502 can login and use the browser from a Personal Computer 501 (including tablet, laptop, notebook, desktop, Smart Phone, any browser based device) to upload and organize content, product management console, a software based application deployed on the Central Server 105 will allow the administration of such content and their mapping to the appropriate NFC tags or stickers 100 using UID and Batch ID reference. The details are described below.

Figure 6:
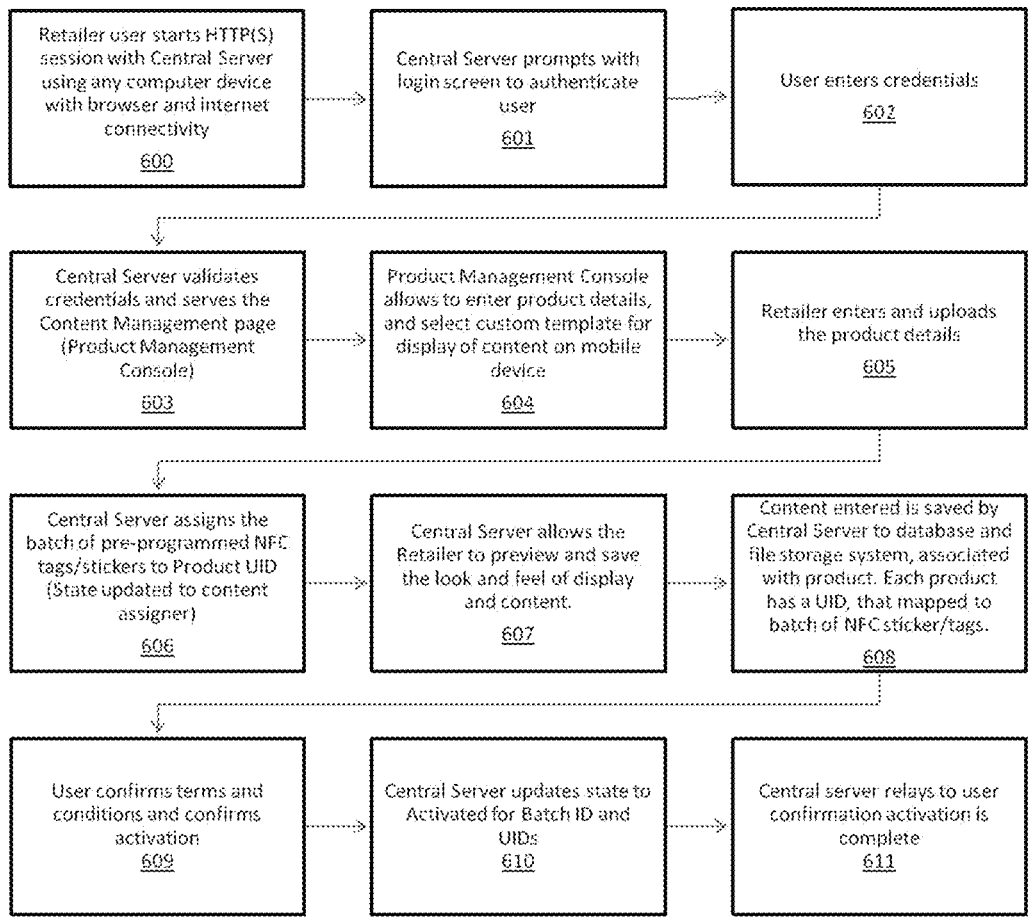
FIG. 6 is a flow diagram showing the method for uploading Product Content by Retailer/Manufacturer according to an embodiment of the disclosure.

Turning to FIG. 6, is a flow diagram showing the method for uploading product content by Retailer/Manufacturer 502 according to an embodiment of the disclosure. Retailer/

Manufacturer 502 user starts HTTP(S) session with Central Server using any computer device with browser and internet connectivity 600. Central Server 105 prompts with login screen to authenticate user 601. User enters credentials 602. Central Server 105 validates credentials and serves the content management page 603. Content management page allows to enter product 500 details, and select custom template for display of content on mobile device 604. Retailer enters and uploads the product 500 details which may include any of the following but not limited to; sales video, product demo, assembly video, manual, product specification, pricing and discount codes 605. Central Server 105 assigns the batch of pre-programmed NFC tags or stickers 100 to Product 500 UID 606. Central Server 105 allows the Retailer/Manufacturer 502 to preview and save the look and feel of display and content 607. Content entered is saved by Central Server 105 to database and file storage system, associated with product. Each product 500 has a UID, that mapped to batch of NFC stickers or tags 608. As mentioned earlier, NFC sticker and tags 100 are preconfigured with identifier to be unique in the disclosure, and have no dependency on the content of the data in determining the identifier values for UID and Batch ID. A batch of UID will be assigned by the Central Server 105 for each product 500 that is the same and/or the information content is desired to be same for such product 500. After Central Server 105 assigns content and set the state to Pending activation, the user is prompted with terms and conditions before activating the NFC stickers or tags 100. User confirms terms and conditions and confirms activation 609. Central Server updates state to Activated for Batch ID and UIDs 610. Central Server relays to user confirmation activation is complete 611.

Figure 7:
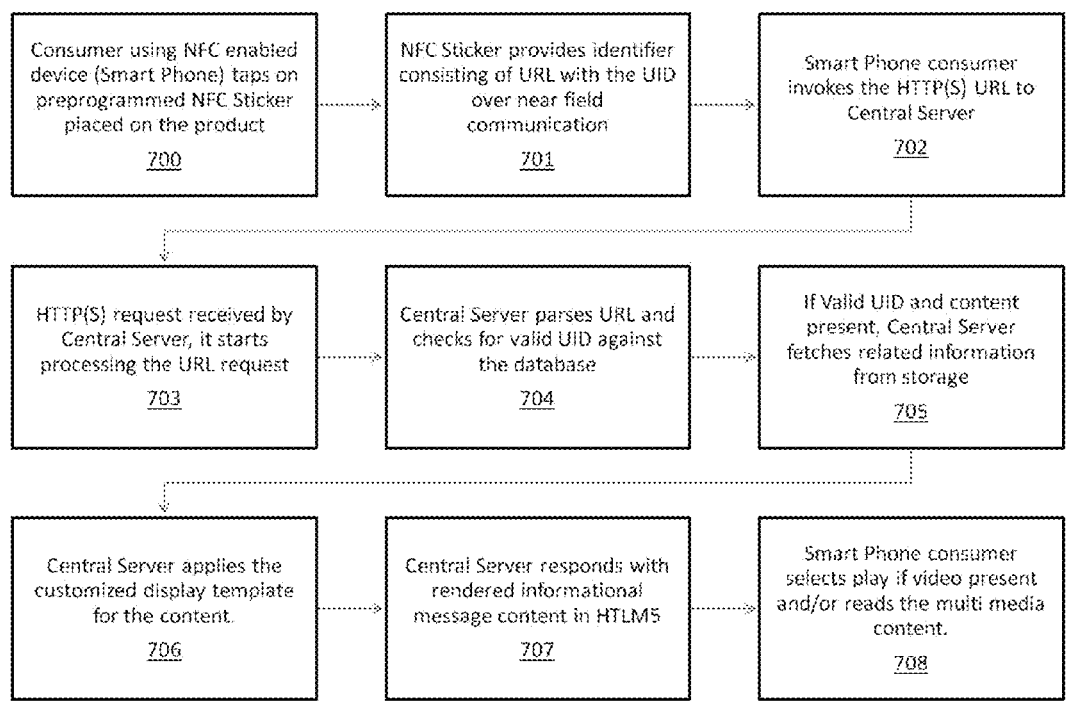
FIG. 7 is a flow diagram showing the method for retrieving Product Content by Consumer using NFC devices according to an embodiment of the disclosure.

Referring to FIG. 7, is a flow diagram showing the method for retrieving Product 500 Content by Consumer 503 using NFC devices 201 according to an embodiment of the disclosure. Consumer 503 using NFC enabled device (Smart Phone) 103 taps on preprogrammed NFC sticker or tag 100 placed on the product 500 or physical artifact or object container such as package, shelves, pedestal, etc 700. Passive NFC sticker or tag 100 provides URL with the UID over near field communication 110 to mobile phone 701. Smart Phone consumer invokes the HTTP(S) URL to Central Server 105 on Network (WLAN, WAN, Wi-Fi, 3G, 4G, or other cellular networks) 702. HTTP(S) request received by Central Server 105, it contains Web 106, Application 107, and Content Server 108 components, it starts processing the URL request 703. Central Server parses URL and checks for valid UID against the database 109 or search able storage 704. If valid UID and content present, application server 106 fetches related information from storage 109, otherwise returns product details not found 705. Central Server 105 applies the customized display template for the content. Content may contain any of the following; sales video, product demo, assembly video, manual, product specification, pricing, discount codes and other relevant data elements found to be of value to convey to consumer 706. Central Server 105 responds with rendered informational message content in HTLM5 707. Smart Phone consumer 103 selects play if video is present and/or reads the multimedia content on display 708.

Figure 9:
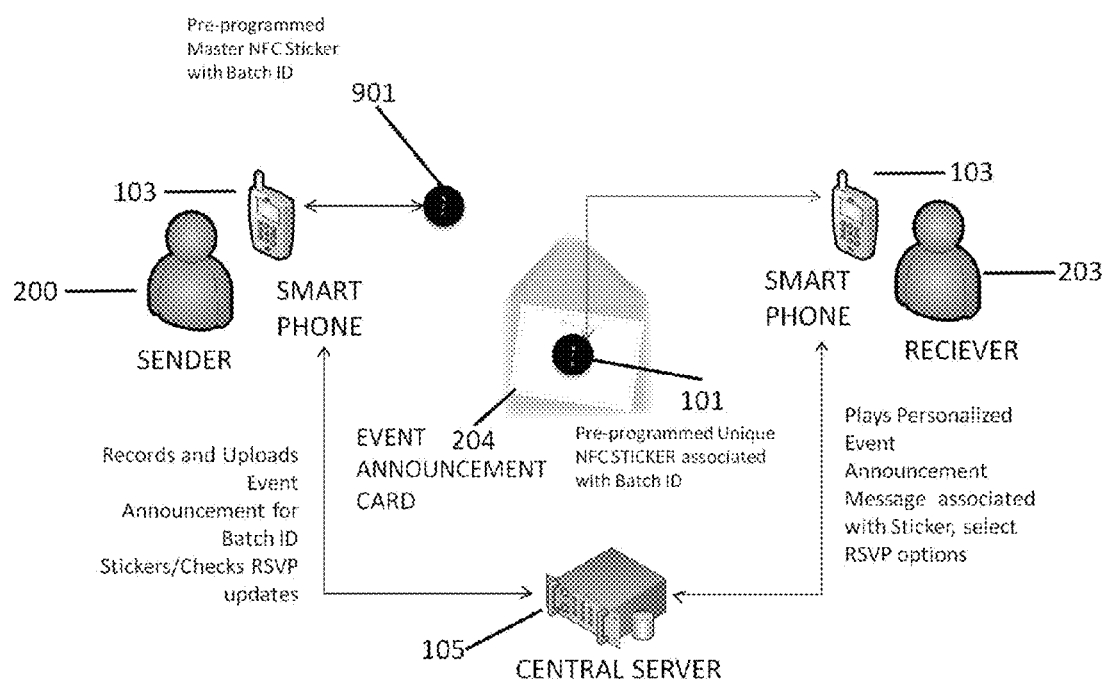
FIG. 9 shows the communication process of Sender and Receiver for the Event Announcement and RSVP using NFC devices according to an embodiment of the disclosure.

Referring to FIG. 9, shows the communication process of Sender 200 and Receiver 203 for the Event Announcement and RSVP, using NFC devices 201 according to an embodiment of the disclosure. The method identified in FIG. 9 is similar to earlier methods and systems illustrated for the greeting card message in FIG. 2, however the concept of preprogrammed Master NFC sticker with Batch ID 901 is introduced to show example of Sender 200 delivering same message to one or more Receiver(s) 203 and the Receiver(s) 203 responding to Sender 200 during the communication. Refer to the earlier sections for system and data communication details between NFC Devices 201 and Central Server 105, below highlights the method.

Continuing on FIG. 9, the Master NFC sticker 901 has a unique batch id, which identifies a group of NFC stickers 101 belonging to the same batch. Central Server 105 manages these relationships between Master 901 and unique NFC stickers 101. In this example the Master NFC sticker 901 is used by the Sender 200 to upload the event announcement (audio or video) by tapping sticker to start the communication as described previously. This can alternatively be achieved, by the initiating user, having directly access the Central Server website from the PC using the Batch ID and upload the message, and check for the RSVP response updates from the recipients that were distributed the NFC stickers with the same Batch ID. Continuing, the Sender selects if the RSVP response is required from the Receiver 203 in the options provided when prompted by Central Server 105 before the upload process. Once complete, this activates all the related NFC stickers 101 in the batch, those stickers can be placed on the Event announcement card 204 or envelope or on any other medium of delivery to Receiver 203. At this time, all the NFC stickers associated with the Batch ID 101, point to the same event announcement recorded by Sender with the Master NFC sticker 901 within Central Server 105. Upon receiving the Event announcement card, Receiver(s) 203 taps on the NFC sticker 101 to play the personalized event announcement and is then prompted on the screen to respond to the RSVP request with entering the name. Central Server 105 receives the RSVP and names entered from multiple Receivers 203 to whom the announcements were distributed. Central Server 105 stores responses for display when inquired by Sender 200. The Sender 200 checks on the RSVP responses by tapping on the Master NFC sticker 901 after activation, and page with RSVP attendee list is displayed containing count and names of attendees, alternatively the Sender can check RSVP responses on Central Server website using the Batch ID. The RSVP request in FIG. 9, which allows Receiver 203 to select RSVP options, is a web based customizable form that solicits input from Receiver 203, for instance it may have RSVP options for selecting dietary preferences, entering number of guests, their names, number of adults, number of kids, and/or guest sign up. Depending on the type of event or campaign, the response form would have custom options for Receiver 203 to respond to, for example a survey, registration or other event related content that is desired during the event management lifecycle.

Figure 10:
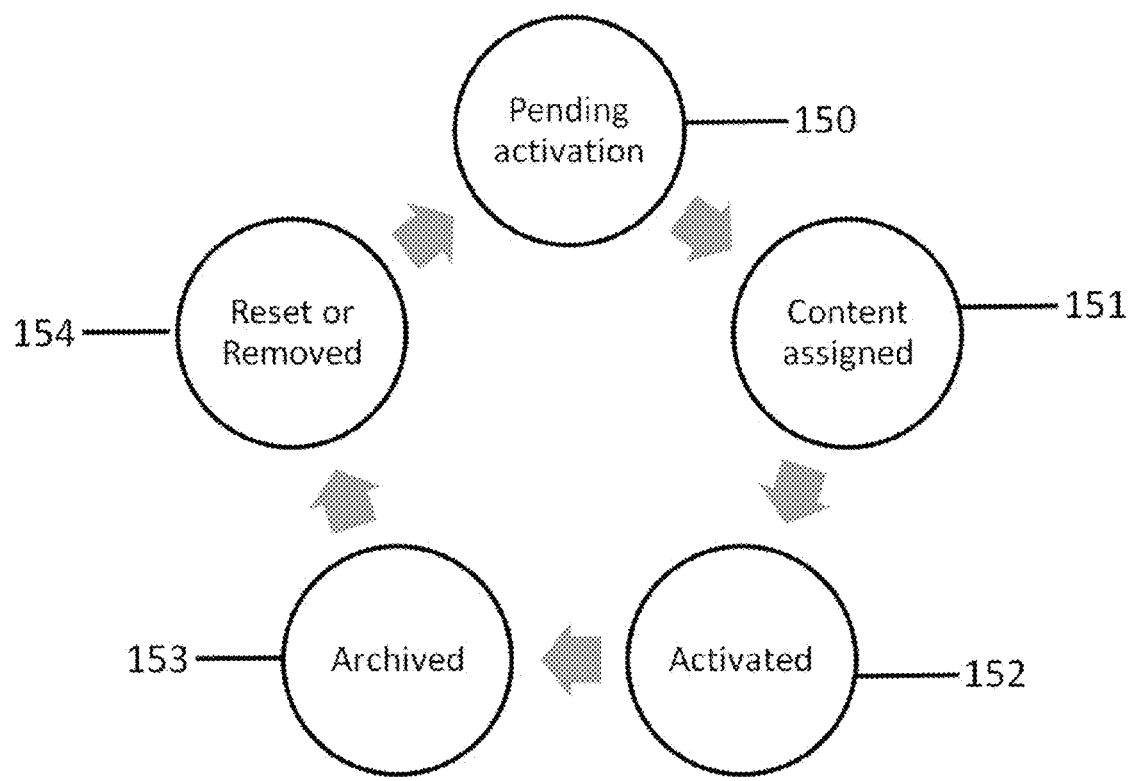
FIG. 10 shows the state diagram for Central Server managed UID and Batch ID states.

Referring to FIG. 10, which shows the state diagram for Central Server managed UID and Batch ID states. The UID and Batch ID are identifiers for NFC sticker or tag 100, the 'state' is transitioned as the Smart Phone user interacts with the sticker by communicating with the Central Server. Following each of the states are described: Pending activation 150, is the initial state after the NFC sticker or tag 100 UID has been entered in the Central Server 105, means it's available for use and is pending activation thus no content is assigned and Central Server 105 will instruct to assign content when invoked; Content assigned 151, is the state when the content is uploaded or assigned or associated with NFC sticker or tag 100, and ready for activation, until activated the Central Server is instructed to accept additional content or allow to review or waiting terms and conditions acceptance by Smart Phone user; Activated 152, is the state when the content is assigned, user accepted terms and conditions, and the sticker is ready for providing content when tapped by Central Server 105; Archived 153, is the state that lets the Central Server know that the content is moved to secondary storage and may require time to retrieve; Reset or Removed 154, in reset state the Central Server 105 removes the previously associated content and discards and then switches to pending activation 150 state, in remove state, the Central Server 105 removes the UID reference completely with content. These states are not final and may be expanded to additional during implementation.

The Central Server 105 is configured to manage 'states' as described above; accept request from Smart Phone 103 and personal computer 501 related to the methods in the disclosure; search content in the database or file system related to the identifiers supplied; retrieve content from storage based on the UID and/or Batch ID; provide content to the requesting user as responses to their request; transform the content for efficient storage by using codec transformations, compression and/or other programming methods; store the content, properties, options and user input; manage the relationship links in storage of all data related to content and NFC stickers or tags 100.

While the invention may be susceptible to various modifications and alternative forms, specific embodiments have been shown by way of example in the drawings and described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A system for communicating greeting and/or informational content using near field communication (NFC) devices, the system comprising: a Central Server wherein the Central Server is configured to communicate greeting and/or informational content over internet protocol (IP) using NFC sticker or tag identifier; a Smart Phone wherein communicates with NFC sticker or tag using near field communication(NFC) and with Central Server using wireless communications; an NFC sticker or tag wherein is configured with a predetermined identifier; and a plurality of the NFC sticker(s) or tag(s) uniquely associated with a group identifier wherein the said group identifier, configured at the Central Server, identifies and/or correlates common content associated with the NFC sticker(s) or tag(s).

2. The system of claim 1 wherein the Smart Phone is configured with NFC Interface, internet browser, and wireless communication(s).

3. The system of claim 1 wherein predetermined identifier comprising of Uniform Resource Locator (URL) that points to the Central Server's internet address; and UID that uniquely identifies the NFC sticker or tag.

4. The system of claim 1 wherein the Central Server is configured to accept requests to store, search, retrieve, provide or communicate content by UID of the NFC sticker or tag, and maintain the associations of the content associated with the plurality of NFC sticker(s) or tag(s) with the group identifier in storage.

5. The system of claim 4 wherein the Central Server accepts requests from Smart Phone with an identifier, that the Smart Phone acquired by tapping NFC sticker or tag using NFC.

6. The system of claim 1 wherein group identifier comprises of a Batch ID, the said Batch ID uniquely identifies a group of UIDs, and references or identifies content associated with the group of UIDs.

7. The system of claim 6 wherein Batch ID of the group identifier represents master NFC sticker or tag UID, the said master NFC sticker or tag UID has one or more NFC sticker or tag UID(s) referencing its content.

8. The system of claim 1, wherein the Central Server comprises of accepting request from a browser based device over internet protocol (IP); prompting for login; accepting login credentials; providing a user interface to assign and manage content by data entry, upload, and/or entering URI links; and configuring, at the Central Server, content associated with the group identifier.

9. The system of claim 1 wherein the system for communicating product content using near field communication (NFC) devices, the system further comprising: a product, wherein the said product has the NFC sticker or tag disposed on or within; and a plurality of consumers with the Smartphone communicating with the said NFC sticker or tag using NFC.

10. The system of claim 9 wherein the product comprises of manufactured product, retail product, poster, display space, goods, pedestal, rack, plaque, frame, painting, retail package content, retail product component, package, shelves, a physical artifact or object container.

11. The system of claim 1, wherein the Central Server comprises of configuring or enabling social share options.

12. A method for communicating product content using near field communication (NFC) devices, the method comprising: configuring an NFC sticker or tag with a predetermined identifier; configuring a group identifier, at a Central Server, that uniquely identifies a plurality of the NFC sticker(s) or tag(s); configuring at the Central Server, common content associated with the plurality of the NFC sticker or tag identifiers with the group identifier; interfacing a Smart Phone with the NFC sticker or tag using NFC to obtain the identifier from the NFC sticker or tag; and accepting, at the Central Server, request for content from the Smart Phone over internet protocol (IP), wherein the requests from the Smart Phone includes the identifier of the NFC sticker or tag.

13. The method of claim 12 wherein the Smart Phone is configured with NFC Interface, internet browser, and wireless communication(s).

14. The method of claim 12 wherein predetermined identifier comprising of Uniform Resource Locator (URL) that points to the Central Server's internet address; and UID that uniquely identifies the NFC sticker or tag.

15. The method of claim 12 wherein the Central Server is configured to accept requests to store, search, retrieve, provide or communicate content by UID of the NFC sticker or tag, and maintain the associations of the content associated with the plurality of NFC sticker(s) or tag(s) with the group identifier in storage.

16. The method of claim 15 wherein the Central Server accepts requests from Smart Phone with an identifier, that the Smart Phone acquired by tapping the NFC sticker or tag using NFC.

17. The method of claim 12 wherein group identifier comprises of a Batch ID, the said Batch ID uniquely identifies a group of UIDs, and references or identifies content associated with the group of UIDs.

18. The method of claim 12, wherein the Central Server comprises of accepting request from a browser based device over internet protocol (IP); prompting for login; accepting login credentials; providing a user interface to assign and manage content by data entry, upload, and/or entering URI links; and configuring, at the Central Server, content associated with the group identifier.

19. The method of claim 12 wherein the method for communicating product content using near field communication (NFC) devices, the method further comprising: a product, wherein the said product has the NFC sticker or tag disposed on or within, a plurality of consumers with the Smartphone communicating with the said NFC sticker or tag using NFC.

20. The method of claim 19 wherein the product comprises of manufactured product, retail product, poster, display space, goods, pedestal, rack, plaque, frame, painting, retail package content, retail product component, package, shelves, a physical artifact or object container.

21. The method of claim 12, wherein the Central Server comprises of providing a selection of custom template(s) for display of content on mobile device.

22. The method for communicating product content of claim 12, the method further comprising: providing a user selection of social share options on the Smart Phone.

23. The method for communicating product content of claim 12, wherein the product content comprises of presale information, post sale information, specifications, manuals, sales literature, discount codes, rebate offerings, reviews, ratings, warrantees, registration, product registration, assembly instructions, recommended configuration and/or usage instructions.

24. The method for communicating product content of claim 12, the method further comprising: configuring or linking, at the Central Server, registration content to group identifier wherein the said registration content solicits user input from the Smart Phone; accepting, at a Central Server, a request for registration content from the Smart Phone; receiving, at the Smart Phone, a user selection and/or entry for registration; and accepting and/or storing, at Central Server, the user selection and/or entry for registration.

25. The method for communicating product content of claim 12, wherein the product content comprises of product registration content to register a product, the said product comprises of a retail product.

26. A method for communicating greeting content using near field communication (NFC) devices, the method comprising: configuring an NFC sticker or tag with a predetermined identifier wherein predetermined identifier comprising of Uniform Resource Locator (URL) that points to a Central Server's internet address and UID that uniquely identifies the NFC sticker or tag; interfacing a Smart Phone with the NFC sticker or tag using NFC to obtain an identifier from the NFC sticker or tag; accepting, at the Central Server, request for content from the Smart Phone over internet protocol (IP), wherein the requests from the Smart Phone includes the identifier of the NFC sticker or tag and the Smart Phone is configured with NFC Interface, internet browser, and wireless communication(s); and protecting, at the Central Server, the anonymity of a Sender and a Receiver wherein the Sender is the author, creator or publisher of the content and the Receiver consumes or views the content associated with the NFC sticker or tag identifier.

27. The method of claim 26 wherein UID that uniquely identifies the NFC sticker or tag represents master NFC sticker or tag UID, the said master NFC sticker or tag UID has a plurality of NFC sticker or tag UID(s) referencing its content.

28. The method of claim 26, the method further comprising: configuring, at the Central Server, activation login credentials for the NFC sticker or tag identifier; configuring or linking, at the Central Server, the content to the UID in storage; accepting, at the Central Server, the login credentials or activation request for identifier; providing, at the Central Server, a user selection of options and properties that comprise of social sharing, greeting occasion, and/or message; receiving, at a Central Server, a request message for content upload and/or user selection; and providing, at the Central Server, content linked to UID.

29. The method of claim 28 wherein the Central Server is configured to accept requests over the internet protocol (IP) by browser based device(s).

30. The method of claim 26, the method further comprising: configuring a group identifier, at the Central Server, that uniquely identifies a plurality of the NFC sticker(s) or tag(s); configuring or linking, at the Central Server, common content associated with the plurality of the NFC sticker or tag identifiers with the group identifier; accepting, at the Central Server, the login credentials or activation request for group identifier; providing, at the Central Server, a user selection of options and properties that comprise of social sharing, greeting occasion, and/or message; receiving, at a Central Server, a request message for content upload and/or user selection; and providing, at the Central Server, content linked to group identifier.

31. A method for communicating event content using near field communication (NFC) devices, the method comprising: configuring an NFC sticker or tag with a predetermined identifier wherein predetermined identifier comprising of Uniform Resource Locator (URL) that points to a Central Server's internet address and UID that uniquely identifies the NFC sticker or tag; configuring a group identifier, at the Central Server, that uniquely identifies a plurality of the NFC sticker(s) or tag(s); configuring at the Central Server, common content associated with the plurality of the NFC sticker or tag identifiers with the group identifier; interfacing a Smart Phone with the NFC sticker or tag using NFC to obtain an identifier from the NFC sticker or tag; accepting, at the Central Server, request for content from the Smart Phone over internet protocol (IP), wherein the requests from the Smart Phone includes the identifier of the NFC sticker or tag and the Smart Phone is configured with NFC Interface, internet browser, and wireless communication(s).

32. The method of claim 31 for communicating event content, the method further comprising: configuring or linking, at the Central Server, RSVP options; accepting, at the Central Server, RSVP responses; receiving, at the Smart Phone, a user selection for RSVP options; accepting, at the Central Server, a request for event status; and providing, at the Central Server, the event status wherein the event status comprises of consolidated RSVP details.

* * * * *